United States Patent
Day

(10) Patent No.: US 7,302,492 B1
(45) Date of Patent: Nov. 27, 2007

(54) METHOD AND APPARATUS FOR MATCHING WEB SERVICE IN APPLICATIONS USING A DATA OBJECT EXCHANGE PROTOCOL

(75) Inventor: Mark Day, Milton, MA (US)

(73) Assignee: Cisco Technology, Inc., San Jose, CA (US)

( * ) Notice: Subject to any disclaimer, the term of this patent is extended or adjusted under 35 U.S.C. 154(b) by 911 days.

(21) Appl. No.: 10/120,106

(22) Filed: Apr. 9, 2002

(51) Int. Cl.
  G06F 15/16 (2006.01)
  G06F 12/00 (2006.01)
(52) U.S. Cl. ............... 709/238; 709/202; 709/226; 711/133; 711/226
(58) Field of Classification Search .......... 709/220, 709/227, 238, 240, 245, 250, 234, 218, 229, 709/203, 246; 707/2, 103, 8; 370/230, 235, 370/260; 713/202, 300, 320, 323, 201; 711/141, 711/133; 380/49; 340/310.01
See application file for complete search history.

(56) References Cited

U.S. PATENT DOCUMENTS

| | | | | |
|---|---|---|---|---|
| 6,134,598 A * | 10/2000 | Raman | .......... | 709/246 |
| 6,338,094 B1 * | 1/2002 | Scott et al. | .......... | 709/245 |
| 6,406,371 B1 * | 6/2002 | Baba et al. | .......... | 463/42 |
| 6,466,971 B1 * | 10/2002 | Humpleman et al. | .......... | 709/220 |
| 6,578,113 B2 * | 6/2003 | Krishnamurthy et al. | ... | 711/141 |
| 6,591,260 B1 * | 7/2003 | Schwarzhoff et al. | .......... | 707/2 |
| 6,678,793 B1 * | 1/2004 | Doyle | .......... | 711/133 |
| 6,718,390 B1 * | 4/2004 | Still et al. | .......... | 709/229 |
| 6,725,381 B1 * | 4/2004 | Smith et al. | .......... | 713/202 |
| 6,810,409 B1 * | 10/2004 | Fry et al. | .......... | 709/202 |
| 6,859,882 B2 * | 2/2005 | Fung | .......... | 713/300 |
| 6,981,031 B2 * | 12/2005 | French et al. | .......... | 709/218 |
| 2002/0002451 A1 * | 1/2002 | Sukehiro | | |

OTHER PUBLICATIONS

D. Box et al., "Simple Object Access Protocol (SOAP) 1.1," World Wide Web Consortium, May 8, 2000.

* cited by examiner

*Primary Examiner*—David Wiley
*Assistant Examiner*—Jude J Jean-Gilles
(74) *Attorney, Agent, or Firm*—Hickman Palermo Truong & Becker LLP

(57) ABSTRACT

Techniques for matching services of a first server with a second server include storing for a translator process transformation rules. The transformation rules transform between hierarchical elements of messages formatted for the first server and hierarchical elements of messages formatted for the second server. When a first message formatted for a particular server of the first server and the second server is received at the translator process, it is determined whether a first element in the first message is associated, in a cache of elements already transformed, with a second element for a second message formatted for a different server. If it is determined that the first element is not associated with the second element in the cache, then the second element is generated using a first rule of the transformation rules. The cache saves substantial processing in messages formatted with a markup language.

34 Claims, 8 Drawing Sheets

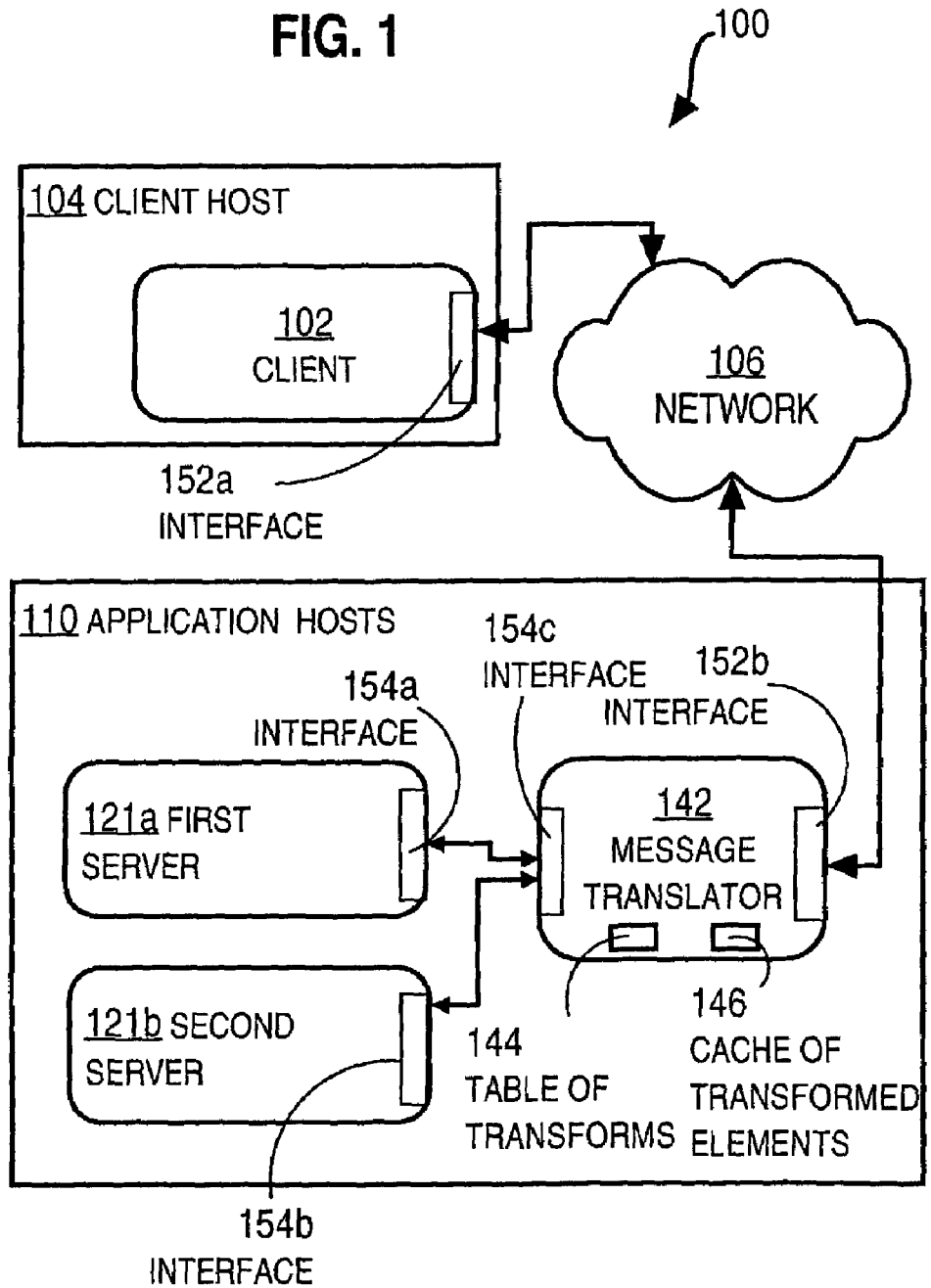

FIG. 2B

230 DATA PACKET RECEIVED FROM FIRST SERVER

232 SOAP ENVELOPE

234 SOAP BODY

240a BOOK INFORMATION OBJECT
- 222a AUTHOR OBJECT
- 244a TITLE OBJECT
- 246a BOOK PRICE OBJECT

248a PUBLICATION DATE OBJECT

249a PUBLISHER NAME OBJECT

240b BOOK INFORMATION OBJECT
- 222b AUTHOR OBJECT
- 244b EDITION OBJECT
- 246b BOOK PRICE OBJECT

248b PUBLICATION DATE OBJECT

249b PUBLISHER NAME OBJECT

••• 239

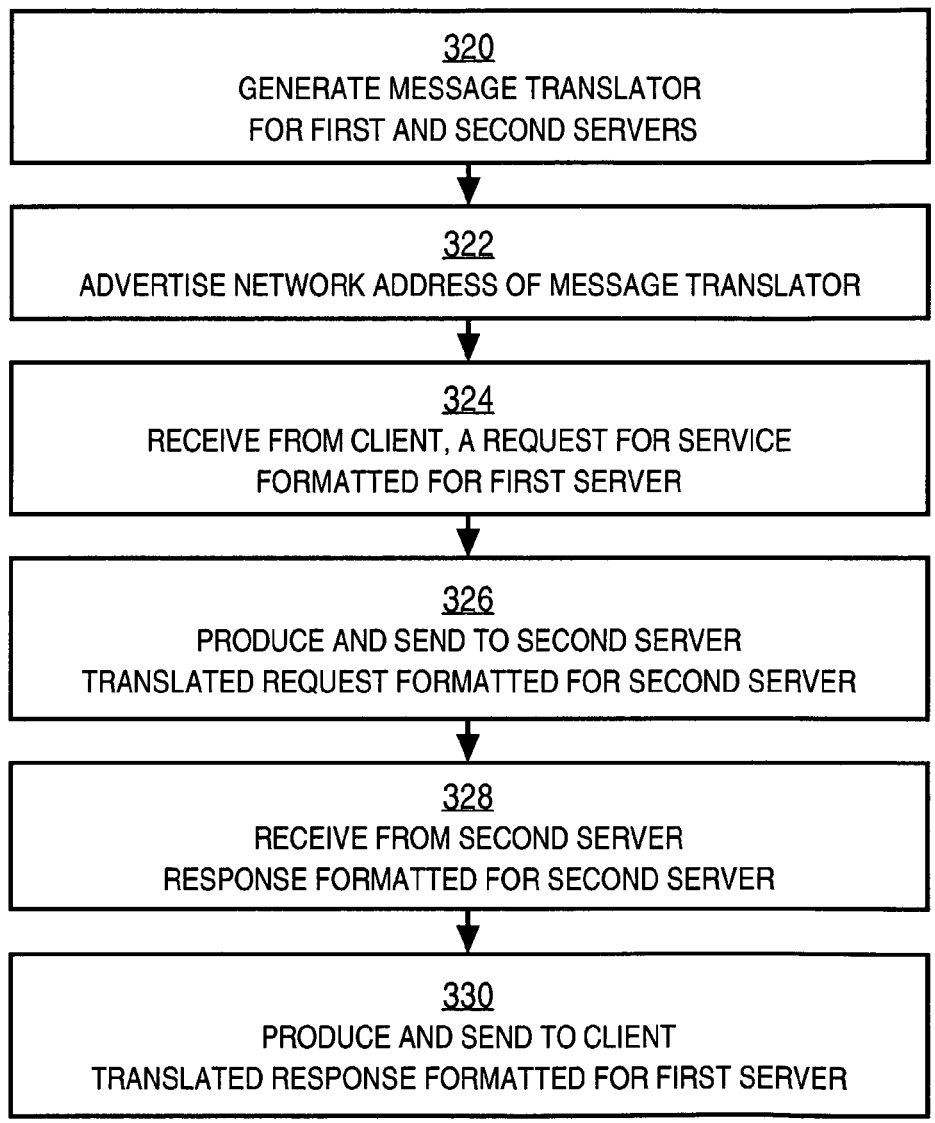

METHOD AND APPARATUS FOR MATCHING WEB SERVICE IN APPLICATIONS USING A DATA OBJECT EXCHANGE PROTOCOL

FIELD OF THE INVENTION

The present invention generally relates to protocols for exchanging data objects between separately developed applications. The invention relates more specifically to techniques for matching a service among different applications providing similar services over a network using a data object exchange protocol.

BACKGROUND OF THE INVENTION

Markup languages are used to describe data by including tags that distinguish information about the data from the data itself. A client process ("client") executing on one node of the network employs network protocols to send a request message in the markup language to a server process ("server") executing on another node. The server responds to the request by providing a service and often employs the network protocols to return a response message in the markup language to the client. The messages are addressed to the proper process on the proper node based on a system for naming the processes on the network. For example, the Universal Resource Identifier (URI) names the node (domain) where a process executes and a directory where a particular executable file resides on that domain.

Extensible Markup Language (XML) provides a common syntax for expressing structure in data. Structured data refers to data that is tagged for its content, meaning, or use. XML provides an expansion of the tagging that is done in Hypertext Markup Language (HTML) and the related Structured Generalized Markup Language (SGML), which focus on format or presentation. In XML the meaning (semantics) of the data can be provided as well as the presentation format. Many applications employ proprietary implementations of XML to communicate between a server and a client. Simple Object Access Protocol (SOAP) is a proposed implementation of XML for exchanging data objects between two processes or "communicating parties" that are independently developed, as described in Simple Object Access Protocol 1_1.htm on the Web at domain and directory w3.org/TR/SOAP, hereinafter referenced as SOAP1.1.

A SOAP message is an XML document that includes a mandatory SOAP envelope, an optional SOAP header, and a mandatory SOAP body. There is a fairly strong similarity between these SOAP elements and the elements of a letter in a postal service. The SOAP envelope, as with a letter's envelope, serves as the unit of transport. The SOAP body, like a letter's contents, is to be carried without being examined or changed. And the SOAP header, like the outside surface of a letter's envelope, is available for various marks or annotations that can affect transport and delivery without disturbing the contents.

The names and attributes of the standard SOAP message elements are defined by an XML schema stored on domain schemas.xmlsoap.org in directory /soap/envelope. The SOAP envelope is the top level XML element of the schema; it is named "Envelope." The optional SOAP header is an optional child element of Envelope and is named "Header." The SOAP body is a mandatory child element of Envelope and is named "Body." The data objects sent between the communicating parties are included in the SOAP Body.

As an example of the problems inherent in working with applications that employ different proprietary implementations of XML to communicate between a server and a client, assume that a user or application wishes to retrieve data about authors of books. Author data and book title data is provided by Company A over the Internet in client/server database A. Database A consists of clientA and serverA; clientA has a GUI that is used by a person, and issues SOAP-based queries to serverA, which retrieves data from the database and answers requests for data from clientA. The clientA application on the user's computer communicates with serverA on the Company A computer using Internet protocols. Inside the packets transported over the Internet are SOAP messages for passing data objects that describe books or authors between clientA and serverA. The data objects are included in a SOAP body of the SOAP message. Assume further that Company B also has a client/server Database B that covers information that overlaps in content with Database A. Database B comprises clientB and serverB that interact in a manner similar to that described above for Database A.

Assume next that database A expects queries to specify author data in the following structure:

<author>
  <firstname>"Mark"</firstname>
  <lastname>"Day"</lastname>
</author>

However, database B expects queries to specify author data as:

<author>
  <name>
    <given>"Mark"</given>
    <family>"Day"</family>
  </name>
</author>

The information that is specified basically is the same, but its markup structure is different. So even if the rest of the interfaces of Database A and Database B are compatible, sending an A query to a B server would fail, and vice-versa.

Similarly, assume that book identifying information is specified to Database A in the form:

<book>
  <title>"My fascinating inventions"</title>
  <author><firstname>"Mark"</firstname><lastname>"Day"</la stname></author>
</book>

However, Database B expects the form:

<book>
  <booktitle>"My fascinating inventions"</booktitle>
  <author><name><given>"Mark"</given><family>"Day"</fa mily></name></author>
</book>

Both Database A and Database B have the same basic information, arranged slightly differently. However, if clientA presents a query in the format of Database A to serverB, clientA will receive an error message because the format of Database A is incompatible with Database B. A similar result occurs if Database B receives a query that is formatted for A. Nevertheless, it is desirable to enable queries to run against both databases, regardless of which client is being used.

Based on the foregoing, there is a clear need for techniques for enabling existing servers to provide services over a network that match the services of a revised server. There is a specific need for a way to enable a first server, which expects requests for information according to a first format, to process and respond to queries that are presented in a second, incompatible format.

SUMMARY OF THE INVENTION

The foregoing needs, and other needs and objects that will become apparent from the following description, are achieved in the present invention, which comprises, in one aspect, a method for matching services of a first server providing a service over a network with a second server providing a similar service. The method includes storing for a translator process transformation rules. The transformation rules transform between hierarchical elements of messages formatted for the first server and hierarchical elements of messages formatted for the second server. When a first message formatted for a particular server of the first server and the second server is received at the translator process, it is determined whether a first element in the first message is associated, in a cache of elements already transformed, with a second element of a second message formatted for a different server. If it is determined that the first element is not associated with the second element in the cache, then the second element is generated using a first rule of the transformation rules.

In an embodiment of this aspect of the invention, after generating the second element, the second element is stored in the cache in association with the first element.

In an embodiment of this aspect of the invention, if it is determined that the first element is associated with the second element in the cache, then the second element is retrieved from the cache.

In other aspects, the invention encompasses a computer apparatus and a computer readable medium configured to carry out the foregoing steps.

These techniques allow a provider of the second server to satisfy client requests formatted for the first server, even for complex, hierarchical elements in request and response messages. The use of a cache leads to substantial savings in processing when elements that require computationally intense transformations do not change over several messages exchanged between client and server. The cache also saves substantial processing for messages formatted with a markup language that adds a large amount of self-describing data to each message.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram that illustrates an overview of a system using a first server and a second server to provide similar services in response to requests by a client, according to an embodiment;

FIG. 2B is a block diagram that illustrates a response message from the first server using a data exchange format with hierarchical elements, according to an embodiment;

FIG. 3 is a flowchart that illustrates a high level overview of one embodiment of a method for using a first server to match services provided by a second server;

DETAILED DESCRIPTION OF THE PREFERRED EMBODIMENT

Figure 2A:
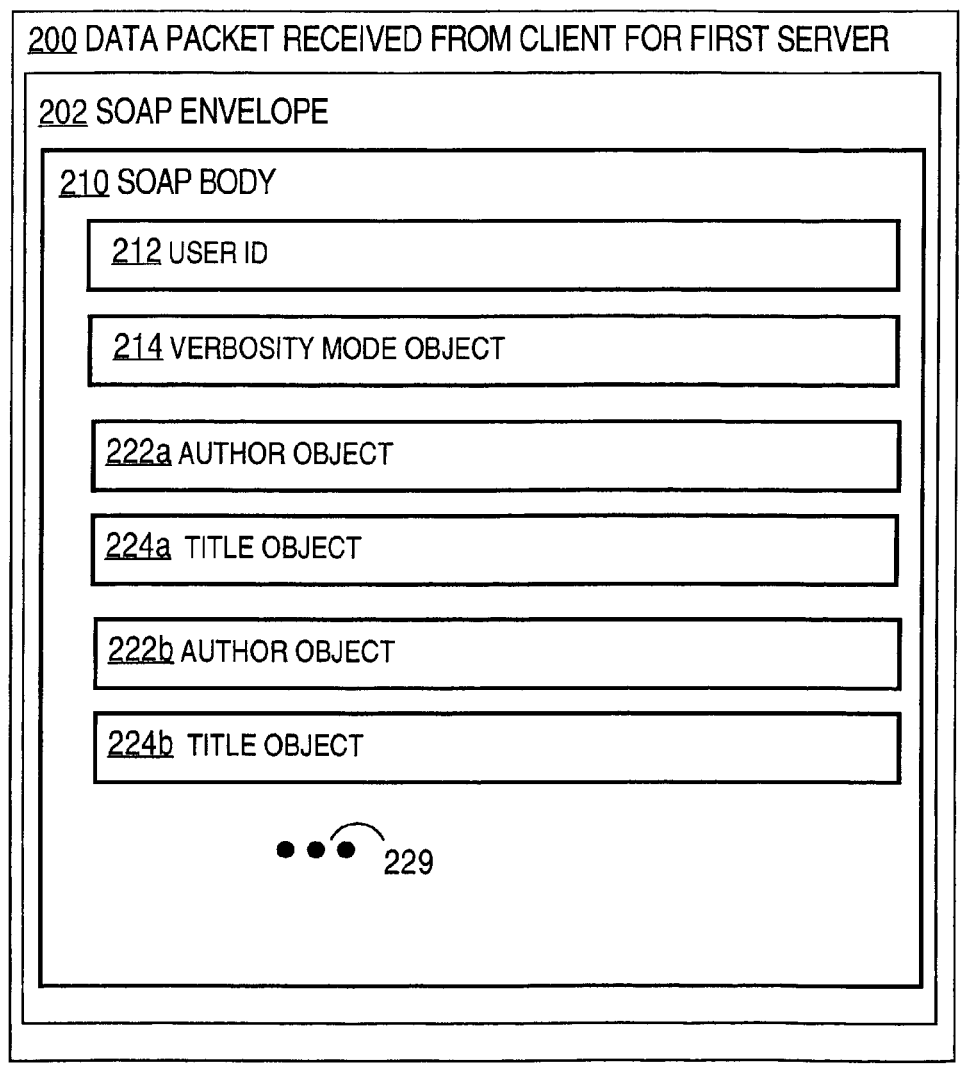
FIG. 2A is a block diagram that illustrates a request message for a first server using a data exchange format with hierarchical elements, according to an embodiment.

A method and apparatus for matching services among applications providing similar services using a data object exchange protocol is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

To illustrate matching services among several servers providing similar services, it is assumed that clients and servers are communicating using messages formatted according to the Simple Object Access Protocol (SOAP) and that SOAP messages are included in data packets transmitted using the Transport Control Protocol and the Internet Protocol (TCP/IP). Embodiments of the invention are not limited to this context, but may use other data packet protocols than TCP/IP and other data object exchange protocols than SOAP. The data object exchange protocol is assumed to have a mechanism to represent arbitrary data objects as self-describing, hierarchical elements.

Structural Overview

FIG. 1 is a block diagram that illustrates an overview of a system 100 using a first server 121*a* and a second server 121*b* to provide similar services in response to requests by a client 102. The client 102 executing on the client host 104 requests the service and receives responses in messages formatted for either server. The first server 121*a* expects requests and represents data internally according to a markup structure that is different from and incompatible with the markup structure that is used by the second server 121*b*. Each of the servers may store information that is of interest to client 102.

The requests and responses are transmitted over a network 106. In one embodiment, network 106 is a packet-switched data network, such as the Internet, and the request is transmitted using a transport and network protocol, such as TCP/IP or HTTP/IP. However, embodiments are applicable to any network context and any transport protocol.

The client and servers exchange data using a data object exchange protocol represented by the interface 152*a* on the client 102 and interfaces 154*a*, 154*b* on servers 121*a*, 121*b*, respectively. In the example embodiment, the interfaces 152*a*, 154*a*, 154*b* represent routines that process SOAP messages to implement SOAP.

A message translator 142 with interfaces 152*c* and 154*b* is provided to mitigate data object exchange between the client 102 and the existing server 121. The message translator is a process implemented in hardware or software or some combination of hardware and software. Hardware components are described in a later section. The message translator includes a table 144 of transforms to apply to elements of the SOAP messages, and a cache 146 for storing transformed elements that may be reused in subsequent messages.

The message translator 142 accepts a first request from client 102 formatted for the first server, and translates the message to a second request formatted for the second server by transforming one or more of the hierarchical elements in the first request to different hierarchical elements in the second request. In some embodiments, the message translator 142 also accepts a first response from second server 121*b*, and translates the message to a second response as if from the first server 121*a* and sent to the client 102. The first response is formatted as if from the first server 121*a* by transforming one or more of the hierarchical elements in the first response to different hierarchical elements in the second response.

Although depicted in FIG. 1 residing on the application hosts 110, the message translator 142 may reside on a network device such as a router, switch, or bridge in other embodiments. The steps performed by the message translator 142 according to an embodiment are described in more detail below with reference to FIG. 2.

Example Servers and Requests

For purposes of illustration, it is assumed that each of the first server 121*a* and second server 121*b* both provide book information in response to requests formatted according to SOAP. The SOAP requests indicate an author name and book title, for which all available database records containing complete information about matching books are desired. Thus, the first server 121*a* and the second server 121*b* provide similar services, in the form of book information in response to SOAP requests received from a client, which requests identify the one or more authors and book titles. It is further assumed that both servers find the authors identified in the requests as author objects in the Body of the SOAP message.

Example Request for Existing Server

FIG. 2A is a block diagram that illustrates a request message ("request") formatted for the first server 121*a*, according to an embodiment. The request arrives in a data packet 200 according to the TCP/IP protocol that identifies the source of the message as the client 102 and the destination as the message translator 142. A message sent to the message translator by a client indicates that a destination for the request is a book information server. In the payload of the TCP/IP packet is a SOAP data exchange message enclosed in a soap envelope 202. The SOAP envelope 202 is simply the root level hierarchical element of the SOAP message hierarchy. In some embodiments, attributes of the SOAP envelope (not shown) indicate that the message is for a book information server and indicate the network resource that defines the schema (the hierarchical elements) for the Body of this particular SOAP message. A hierarchical element at the second level of the SOAP message hierarchy for all SOAP messages is the Body element 210.

The body element includes several hierarchical elements at a third level of the hierarchy defined in the schema associated with this SOAP message. In the illustrated example, the third level of the hierarchy includes a user identification (user ID) object 212, a verbosity mode object 214, a first author object 222*a*, a first title object 224*a*, and a second author object 222*b*, and a second title object 224*b*. Ellipsis 229 indicates zero or more additional pairs of author objects and title objects. Each of these objects may contain one or more attributes including other objects at a deeper level of the hierarchy. For example, a request formatted according to Database B of the introductory example could include attributes referring to a given name and family name of an author.

The user ID object 212 is assumed to have a single attribute whose value uniquely indicates one subscriber to the service.

The verbosity mode object is also assumed to have a single attribute. The value of the attribute of the verbosity mode object indicates whether the book information in the response is to be accompanied by one or more additional objects describing the book titles. For example, it is assumed that a verbosity mode object attribute value of "0" indicates no additional objects are to be included in the response; an attribute value of "1" indicates that a publication date object describing the year of publication of the associated book title is to be included with each book title; an attribute value of "2" indicates that a publisher object identifying a publisher of the associated book title is to be included with each book title; and an attribute value of "3" indicates that both a publisher object and a publication date object are to be included with each book title.

The author object is assumed to have two attributes, first name attribute indicating the first or given name of the author, and a last name attribute indicating the last or family name of the author. The values of the attributes of the author object uniquely identify whose book titles are being requested.

The title object is assumed to have a single attribute, comprising a book title. One object at the third level of the hierarchy, comprising the author object and the title object, is included in the request message for each individual for which information is desired by the subscriber. For example, a second pair of objects is included for a second requested book using the second author object 222*b* and the second title object 224*b*. The ellipsis 229 indicates one or more additional objects or pairs of objects at the third level of the hierarchy.

Table 1 lists SOAP statements that specify values for SOAP elements corresponding to the above objects for an illustrated example request message formatted for the existing server 121. An ellipsis in line 1 indicates data that precedes the SOAP message in the data packet 200. The SOAP message begins in the statement of lines 2 and 3, which opens the root hierarchical element of the SOAP message, the SOAP Envelope element. The ellipsis in line 3 indicates attributes of the SOAP Envelope element that specify the file where the SOAP schema is defined and the process to which the SOAP message is destined. The corresponding closing statement for the SOAP Envelope element is shown in line 22.

TABLE 1

Example Request Message for First Server

| line number | SOAP statement |
|---|---|
| 1 | . . . |
| 2 | <SOAP-ENV:Envelope |
| 3 | . . . > |
| 4 |   <SOAP-ENV:Body> |
| 5 |     <USERID> "JohnSmithID" </USERID> |
| 6 |     <VERB_MODE> "3" </VERB_MODE> |
| 7 |     <BOOK> |
| 8 |       <TITLE>"My Fascinating Inventions"</TITLE> |

TABLE 1-continued

Example Request Message for First Server

| line number | SOAP statement |
|---|---|
| 9 | <AUTHOR> |
| 10 | <FIRSTNAME>"Mark"</FIRSTNAME> |
| 11 | <LASTNAME>"Day"</LASTNAME> |
| 12 | </AUTHOR> |
| 13 | </BOOK> |
| 14 | <BOOK> |
| 15 | <AUTHOR> |
| 16 | <FIRSTNAME> "Donald" </FIRSTNAME> |
| 17 | <LASTNAME>"Knuth"</LASTNAME> |
| 18 | </AUTHOR> |
| 19 | <TITLE>"The Art of Computer Programming"</TITLE> |
| 20 | </BOOK> |
| 21 | . . . |
| 22 | </SOAP-ENV:Body> |
| 23 | </SOAP-ENV:Envelope> |

The SOAP message body begins in the statement of line 4, which opens the second hierarchical level element of the SOAP message, the SOAP Body element. The corresponding closing statement for the SOAP Body element is shown in line 22.

Within the SOAP Body element are several third hierarchical level elements described above with respect to FIG. 2A. The user ID object 212 corresponds to the SOAP element USERID. The statement providing a value for the USERID element is shown in line 5. Between the opening tag <USERID> and the closing tag </USERID> of the USERID element, is a value of "JohnSmithID" for the element. The value is assumed to indicate a user ID for the user John Smith.

The verbosity mode object 214 corresponds to the SOAP element VERB_MODE. The statement providing a value for the VERB_MODE element is shown in line 6. Between the opening tag <VERB_MODE> and the closing tag </VERB_MODE> of the VERB_MODE element, is a value of "3" for the element. The value is assumed to indicate that the response should include the publication date and the publisher name.

The first author object 222a corresponds to the SOAP element AUTHOR in lines 9 through 12, inclusive. Between the opening tag <AUTHOR> in line 9 and the closing tag </AUTHOR> of the AUTHOR element in line 12, are FIRSTNAME element specified by the statement on line 10 and a LASTNAME element specified by the statement on line 11. Between the opening tag <FIRSTNAME> and the closing tag </FIRSTNAME> of the FIRSTNAME element, is a value of "Mark" for the element. Between the opening tag <LASTNAME> and the closing tag </LASTNAME> of the LASTNAME element, is a value of "Day" for the element. Taken together, these values are assumed to indicate that the first book requested from the A Database has an author name of "Mark Day".

The first title object 224a corresponds to the SOAP element TITLE defined in line 8. Between the opening tag <TITLE> and the closing tag </TITLE> of the element in line 8, is a value of "My Fascinating Inventions" for the element. The value is assumed to indicate the title for the desired book.

The second author object 222b corresponds to the SOAP element AUTHOR shown in lines 15 through 18, inclusive. Between the opening tag <AUTHOR> in line 15 and the closing tag </AUTHOR> of the AUTHOR element in line 18, are a FIRSTNAME element specified by the statement on line 16 and a LASTNAME element specified by the statement on line 17. Between the opening tag <FIRSTNAME> and the closing tag </FIRSTNAME> of the FIRSTNAME element, is a value of "Donald" for the element. Between the opening tag <LASTNAME> and the closing tag </LASTNAME> of the LASTNAME element, is a value of "Knuth" for the element. Taken together, these values are assumed to indicate that the second book requested from the database is by author "Donald Knuth".

The second title object 224b corresponds to the SOAP element TITLE shown in line 19. Between the opening tag <TITLE> and the closing tag </TITLE> of the TITLE element in line 19 is a value indicating a book title, "The Art of Computer Programming."

The ellipsis on line 21 indicates other SOAP statements defining pairs of AUTHOR and TITLE objects for other requested books.

Example Response from First Server

In response to receiving the request illustrated in FIG. 2A and Table 1, the first server 121a generates and sends the SOAP response message depicted in FIG. 2B. FIG. 2B is a block diagram that illustrates a response message from the first server using a data exchange format with hierarchical elements, according to an embodiment.

The response arrives in a data packet 230 according to the TCP/IP protocol that identifies the source of the message as the first server 121a and the destination as the message translator 142. In some embodiments, other data in the TCP/IP packet, such as a port, can be used to indicate the particular client associated with the response. In the payload of the TCP/IP packet is a SOAP data exchange message enclosed in a SOAP envelope 232. The SOAP envelope 232 is simply the root level hierarchical element of the SOAP message hierarchy. Attributes of the SOAP envelope (not shown) indicate that the message is for the book information client on a particular host, and indicates the network resource that defines the schema (the hierarchical elements) for the Body of this particular SOAP message. A hierarchical element at the second level of the SOAP message hierarchy for all SOAP messages is the Body element 234.

The body element includes several hierarchical elements at a third level of the hierarchy defined in the schema associated with this SOAP message. In the illustrated example, the third level of the hierarchy includes book information objects 240a, 240b, publication date objects 248a, 248b, and publisher name objects 249a, 249b. The publication date objects and the publisher name objects are included in the response based on the verbosity mode value of "3" specified in the example request listed in Table 1, above. Ellipsis 239 indicates additional sets of third level elements, each set including a book information object, a publication date object, and a publisher name object. Each of these objects may contain one or more attributes including other objects at a deeper level of the hierarchy.

For example, each book information object 240a, 240b includes an author object 222a, 222b, respectively, and a edition detail object 244a, 244b, respectively, both object types described above. Each author object 222a, 222b is assumed to include attributes or objects corresponding to the FIRSTNAME and LASTNAME SOAP elements described herein, which are omitted from FIG. 2B for clarity. Each book information object 240a, 240b also includes a book price object 246a, 246b, respectively. Each book price object can have attributes identifying, for example, a price of the associated edition, shipping and handling charges, etc.

An example first server provides a book information service to a corresponding client using the request and response described above.

Example Request for Second Server

It is further assumed for purposes of illustration, that the client 102 is a book information retrieval process that is compatible with service available from some servers connected to network 106. It is assumed that a second server provides, in a response sent to the client, book information that is similar to the information provided by the first server, but in a different format. For example, the first server could have a database storing fiction books, and the second server could store non-fiction books. Requests for the existing server include objects in a markup structure that is semantically similar to but formally incompatible with the markup structure expected by the second server.

Because the book query information is structured differently in the Body of the SOAP requests that are directed to the second server, the first server cannot find corresponding book objects. Thus, a client that issues requests with data structured only as preferred by the first server cannot communicate with servers that process and respond to requests with information in a different structure.

Figure 2C:
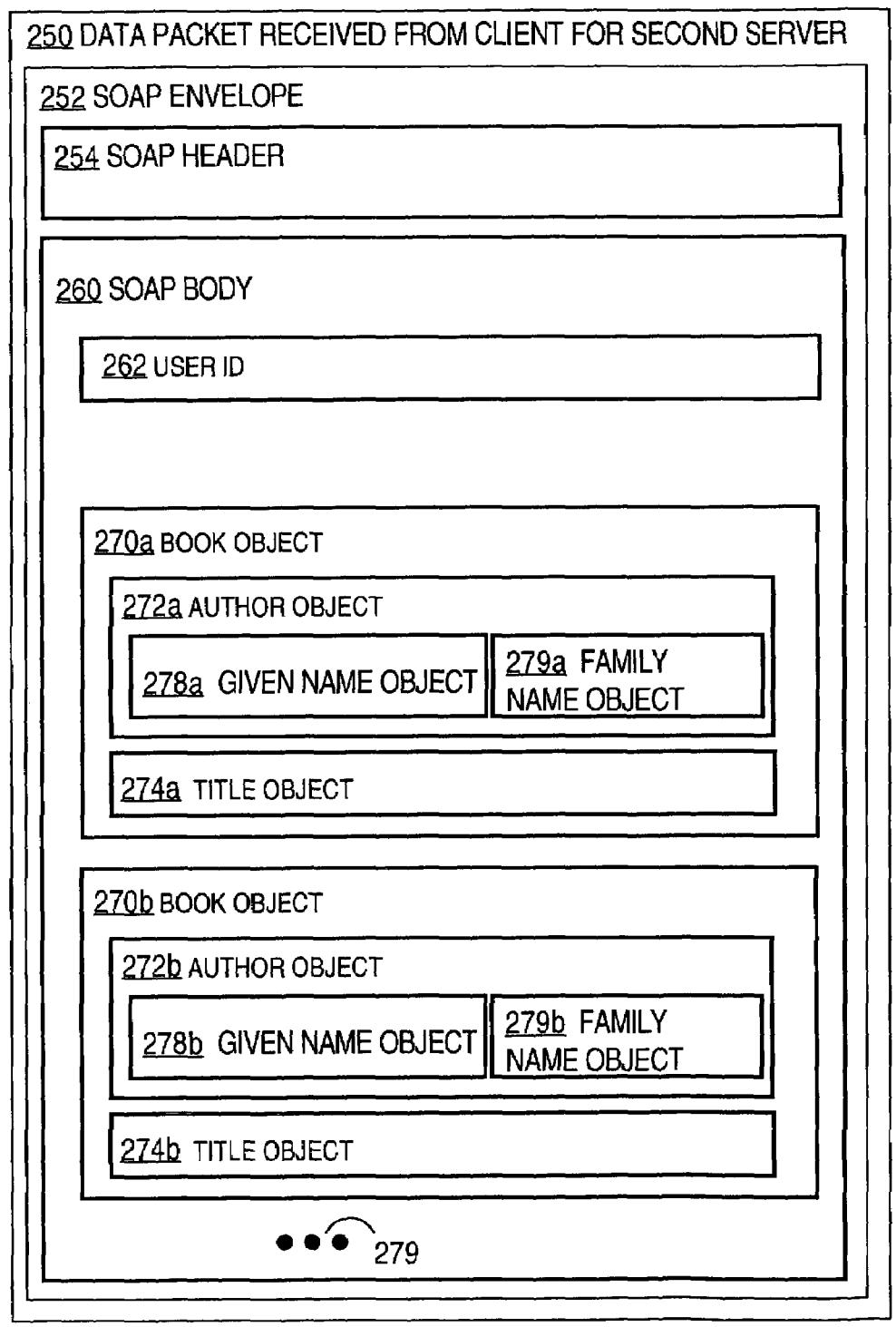
FIG. 2C is a block diagram that illustrates a request message for a second server, according to an embodiment.

FIG. 2C is a block diagram that illustrates a request from the client that is formatted for a second server. The request arrives in a data packet 250 according to the TCP/IP protocol that identifies the source of the message as the client 102 and the destination as the message translator 142. In some embodiments, this indicates the destination is a book information server. In the payload of the TCP/IP packet is a SOAP data exchange message enclosed in a SOAP envelope 252. Hierarchical elements at the second level of the SOAP message hierarchy include the SOAP Header element 254 and the SOAP Body element 260.

The Body element includes several hierarchical elements at a third level of the hierarchy defined in the schema associated with this SOAP message. In the illustrated example, the third level of the hierarchy includes a user identification (user ID) object 262, a first book object 270a, and a second book object 270b. Ellipsis 279 indicates additional book objects. Each of these objects may contain one or more attributes including other objects at a deeper level of the hierarchy.

The user ID object 262, like the user ID object 212 in the request for the first server, is assumed to have a single attribute whose value uniquely indicates one subscriber to the service.

Each book object 270a, 270b, as described above for the response of the existing server, is assumed to have two attributes: an author object 272a, 272b, respectively; and a title object 274a, 274b, respectively. However, unlike the book objects described above, the book objects formatted for the second server include a name object 273a having a given name object 278a and a family name object 279a.

It is assumed that each author object 272a, 272b and its constituent objects in the request 250 includes values that identify the name of an author of a book about which the client wants more information. It is assumed that the values in the title objects 274a, 274b, indicate the title of a book for which more information is desired.

Table 2 lists SOAP statements that specify values for objects for an illustrated example request formatted for the second server. An ellipsis in line 1 indicates data that precedes the SOAP message in the data packet 250. The SOAP message begins in the statement of line 2, which opens the root hierarchical element of the SOAP message, the SOAP Envelope element. The ellipsis in line 2 represents data that indicates attributes of the SOAP Envelope element that specify the file where the SOAP schema is defined and the process to which the SOAP message is destined. The corresponding closing statement for the SOAP Envelope element is shown in line 37.

TABLE 2

Example Request Message for Second Server

| line number | SOAP statement |
| --- | --- |
| 1 | ... |
| 2 | <SOAP-ENV:Envelope . . . > |
| 3 | <SOAP-ENV:Header> |
| 4 | ... |
| 5 | </SOAP-ENV:Header> |
| 6 | <SOAP-ENV:Body> |
| 7 | <USERID>"JohnSmithID"</USERID> |
| 8 | <BOOK> |
| 9 | <TITLE>"The Grapes of Wrath"</TITLE> |
| 10 | <AUTHOR> |
| 11 | <NAME> |
| 12 | <GIVEN> "John" </GIVEN> |
| 13 | <FAMILY>"Steinbeck"</FAMILY> |
| 14 | </NAME> |
| 15 | </AUTHOR> |
| 16 | </BOOK> |
| 17 | <BOOK> |
| 18 | <TITLE>"The Wrath of Grapes"</TITLE> |
| 19 | <AUTHOR> |
| 20 | <NAME> |
| 21 | <GIVEN> "Lewis" </GIVEN> |
| 22 | <FAMILY>"Purdue"</FAMILY> |
| 23 | </NAME> |
| 24 | </AUTHOR> |
| 25 | </BOOK> |
| 26 | ... |
| 27 | </SOAP-ENV:Body> |
| 28 | </SOAP-ENV:Envelope> |
| 29 | |

This SOAP envelope includes a SOAP Header defined by the statements in lines 3 through 5, inclusive. The SOAP header includes a SOAP Header entry element that can encapsulate various metadata.

The SOAP message body begins in the statement of line 6, which opens the second hierarchical level element of the SOAP message, the SOAP Body element. The corresponding closing statement for the SOAP body element is shown in line 27.

Within the SOAP Body element are several third hierarchical level elements described above with respect to FIG. 2C. The user ID object 262 corresponds to the SOAP element USERID as described above for Table 1. The statement providing a value for the USERID element is shown in line 7.

The first book object 270a corresponds to the SOAP element BOOK. The statement providing a value for the BOOK element is shown in lines 8 through 16, inclusive. Between the opening tag <BOOK> in line 8 and the closing tag </BOOK> in line 16, are a TITLE element specified by the statement on line 9, inclusive; and an AUTHOR element specified by the statement on lines 10 through 15, inclusive. The TITLE element is described above with reference to Table 1.

The AUTHOR is different in the request formatted for the second server. Between the opening tag <AUTHOR> in line 10 and the closing tag </AUTHOR> in line 15, is a GIVEN element on line 12, instead of FIRSTNAME element.

Between the opening tag <FAMILY> and the closing tag </FAMILY> on line 13, is a value "Steinbeck," which is provided rather than the LASTNAME element of the request for the first server.

The second book object 270b corresponds to the SOAP element BOOK shown in lines 17 through 25, inclusive. Between the opening tag <BOOK> in line 17 and the closing tag </BOOK> in line 25, are a TITLE element specified by the statement on 18; and an AUTHOR element specified by the statement on lines 19 through 24, inclusive. The TITLE element is as described above with reference to line 19 of Table 1.

The ellipsis on line 26 indicates other SOAP statements defining book objects for other requested book information.

Example Response from Second Server

Figure 2D:
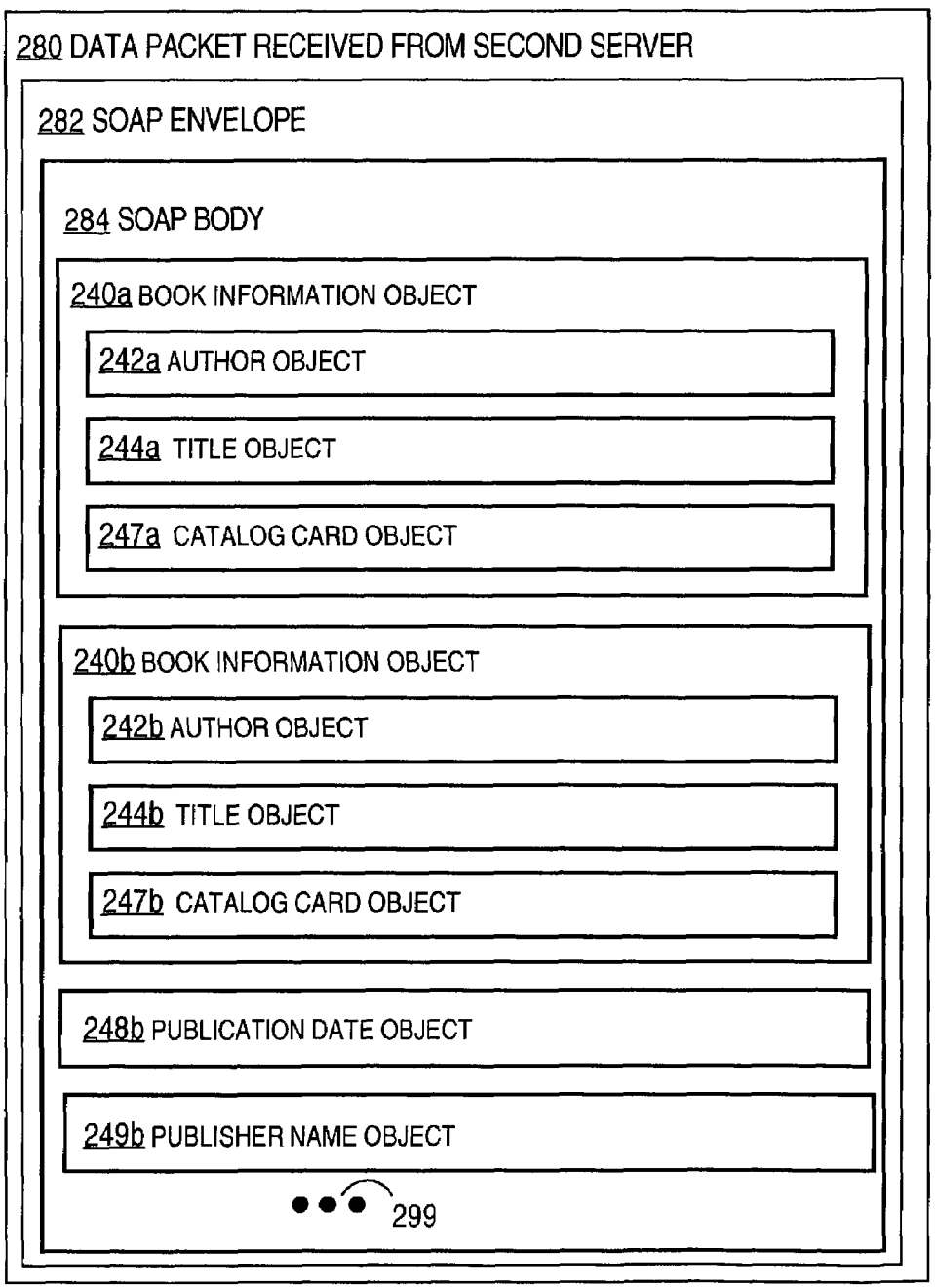
FIG. 2D is a block diagram that illustrates a response message from the second server, according to an embodiment.

In response to receiving the request illustrated in FIG. 2C and Table 2, the second server generates and sends the SOAP response message depicted in FIG. 2D. FIG. 2D is a block diagram that illustrates a response message from the second server using a data exchange format with hierarchical elements, according to an embodiment.

The response arrives in a data packet 280 according to the TCP/IP protocol that identifies the source of the message and the destination as the client 102. In the payload of the TCP/IP packet is a SOAP data exchange message enclosed in a SOAP envelope 282. The SOAP envelope 282 is simply the root level hierarchical element of the SOAP message hierarchy. Attributes of the SOAP envelope (not shown) indicate that the message is for client 102 on host 104, and indicates the network resource that defines the schema (the hierarchical elements) for the Body of this particular SOAP message. A hierarchical element at the second level of the SOAP message hierarchy for all SOAP messages is the Body element 284.

The Body element includes several hierarchical elements at a third level of the hierarchy defined in the schema associated with this SOAP message. In the illustrated example, the third level of the hierarchy includes book information objects 240a, 240b, publication date object 248b, and publisher name object 249b. Each of these objects may contain one or more attributes including other objects at a deeper level of the hierarchy, as described above for FIG. 2B.

Ellipsis 299 indicates additional sets of third level elements. Each set includes a book information object. Some sets include a publication date object and a publisher name object, but other sets do not.

An example second server provides a book information service for non-fiction books to a client using the request and response described above. The request formatted for the second server, depicted in FIG. 2C and Table 2, differs from the request formatted for the first server, depicted in FIG. 2A and Table 1. In addition, the response formatted for the second server, depicted in FIG. 2D, differs from the response formatted for the first server, depicted in FIG. 2B. For example, the response of FIG. 2D may additionally include catalog card objects 247a, 247b, for each book information object, which provide Library of Congress catalog card data, which are not provided by the first server.

Functional Overview

FIG. 3 is a flowchart that illustrates a high level overview of one embodiment 300 of a method for using an existing server to match services provided by a revised server. Although steps are shown in FIG. 3 and following flowcharts in a particular order, in other embodiments the steps may occur in a different order or overlapping in time.

In step 320, the entity that provides the first server 121a, generates and stores a message translator for transforming between messages formatted for the first server and messages formatted for the second server. Step 320 includes forming one or more static tables that associate with each element being transformed at each level of the hierarchy, a key component, and an action to perform based on the key component. Elements that are not transformed need not have a static table. In some embodiments the elements not transformed are provided with a table that indicates there is no key element or no action to perform.

Thus, the first server and second server may have the same basic information, arranged slightly differently. It is desirable to enable either the first server or the second server to respond to a query from the client, regardless of whether the query is issued in a format compatible with the first server or the second server. Therefore, transformations between the formats are provided.

For example, to transform a request of Table 2 formatted for the second server to a request like the request of Table 1 formatted for the first server, static transformations are defined. In one embodiment, static transformation tables are formed for each level of the SOAP hierarchy.

As an example, a transformation for the <book> element from the first server to the second server may have the following rules:

<title>x</title> -> <booktitle>x</booktitle>
<author>x</author> -> apply <author>transformation to x
Similarly, the transformation rule for <author>may be:
<firstname>x</firstname>z<lastname>y</lastname>
-> <name><given>x</given><family>y</family></name>z In this rule, the value "z" serves to capture anything that happened to appear between the firstname element and the lastname element, and move it outside the name structure. Multiple internal states may be required to carry out a transformation of this form. The details of implementing such translations are considered well understood in this field, especially in the context of compilers and grammar processing; pertinent techniques may be found, for example, in textbooks such as Hopcroft et al., Introduction to Automata Theory, Languages, and Computation.

The foregoing transformations enable a user of the first server also query the second server. However, the results will come back in the form used by the second server, and therefore converse transformation rules are also needed. As an example, rules of transformation for the <book>element from the second server to the first server may be:

<booktitle>x</booktitle> -> <title>x</title>
<author>x</author> -> apply <author> transformation to x The transformation rule from the second server to the first server for <author> may be:
<name><given>x</given><family>y</family></name>
-> <firstname>x</firstname><lastname>y</lastname>

This rule is not symmetric with the converse transformation from the first server to the second server; any field that used to be between the firstname element and the lastname element is not moved back between them.

The foregoing rules assume, for simplicity that both the first server and second server have the same syntax for invoking an operation. If so, the foregoing transformations mean that a query from the first server may be forwarded to the second server, and the results from the second server may be presented to A, and vice-versa.

The problem of the first server and the second server having different syntax is addressed as follows. Fundamentally, a SOAP message is just another kind of markup. Static transformations among different markup formats may be defined as long as the transformation is not required to create information as part of transformation. Therefore, for a large class of mismatched invocation formats, similar static transformations and caching of those transformations may be used to match up the invocation syntaxes.

In step 322, the entity that provides the first server advertises the network address of the message translator. For example, Company A, which provides the SOAP-compatible first server 121*a* advertises the address, such as the URI, of the message translator 142. It is assumed for purposes of illustration that the message translator has the URI of "A.com/SOAPBI/BI" and that the server 121*a* has the URI of "A.com/SOAPBI/BI1." Thus, when a user obtains and installs a book information client, and registers with Company A to receive book information using the client, Company A informs the user to connect to the server at A.com/SOAPBI/BI. The information about the address can be passed in any manner. For example, the address of the message translator can be passed in information presented to the user with literature included with the client, or in a Web page, so that the user can enter the address through a dialog box of the client; or, the client connects with the domain A.com and is automatically passed the address of the message translator.

In step 324, the message translator receives a request from the client for service, formatted for the first server. For example, message translator 142 at A.com/SOAPBI/BI receives a SOAP request as illustrated in Table 2 from the client 102.

In step 326, the message translator produces and sends to the second server a translated request with one or more transformed hierarchical elements, so that the response is formatted for the second server. Rules are applied based on the static tables, or transformed elements previously stored are retrieved from cache or both. For example, in step 326, the request depicted in FIG. 2C and Table 2 is translated to the request depicted in FIG. 2A and Table 1 by transforming one or more hierarchical elements. Step 326 is described in more detail below with reference to FIG. 4.

In step 328, the message translator receives a response from the second server. The response is formatted for the second server. For example, the message translator 142 receives, from the existing server 121*a* at A.com/SOAPBI/BI1, a response as depicted in FIG. 2B.

In step 330, the message translator produces and sends to the client a translated response with one or more transformed hierarchical elements, so that the response is formatted for the first server. Rules are applied based on the static tables, or transformed elements previously stored are retrieved from cache or both. For example, in step 330, the response depicted in FIG. 2B is translated to the response depicted in FIG. 2D by transforming one or more hierarchical elements. Step 330 is also described in more detail with reference to FIG. 4.

Method Performed by Message Translator

Figure 4:
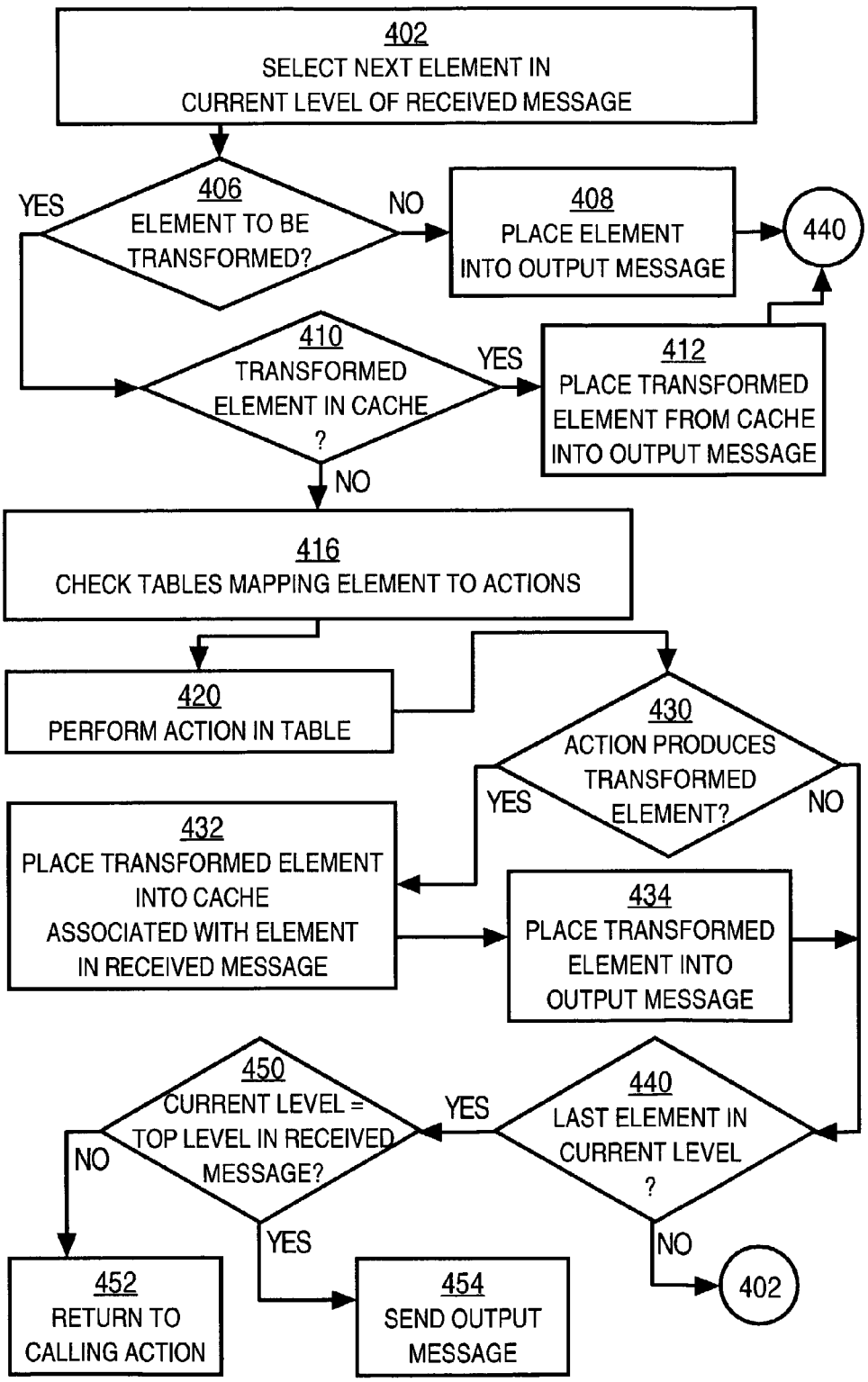
FIG. 4 is a flowchart that illustrates an embodiment of a step of the method depicted in FIG. 3.

FIG. 4 is a flowchart that illustrates an embodiment 400 of a method performed by the message translator in steps 326 and 330 of FIG. 3. In steps 326 and 330 a message has already been received at the message translator. The message translator produces an output message in response to receiving an input message. In the illustrated example, it is assumed that the input message is the request of Table 2 for the second server, and the output message is the request of Table 1 for the first server.

In step 402, the next element in the current level of the hierarchy of elements in the message is selected. According to an illustrated embodiment, the hierarchy is traversed from the top (root) level to successively lower levels of the hierarchy. When step 402 is first performed, the current level of the hierarchy is the root level of the hierarchy. When step 402 is first performed on a SOAP message, the current level is the SOAP envelope level. At subsequent times, the current level in step 402 may be a lower level of the hierarchy.

The next element of the current level is the first element of the current level the first time step 402 is performed at a level. For example, when performed during step 326, the first level of the SOAP envelope includes two elements, a Header element and a Body element; and the next element is the first of these, i.e., the Header element. At subsequent times, the next element in step 402 may be a different element of the current level.

In step 406, it is determined whether the next element is to be transformed. For example, it is determined whether the next element appears in a static table. If not, control passes to step 408 to place the element in the output message. Control then passes to step 440 to determine whether the element is the last in the current level and whether the current level is the last level, as described below. For example, if the next element of the current level is the USERID element that is not transformed, then the USERID element does not appear in any static table, and the USERID element is placed directly in the output message.

If it is determined in step 406 that the element is to be transformed, control passes to step 410 to determine whether the element has previously been transformed and stored in a cache. For example, when the servers are used in the context of online book sales, a subscriber who is considering purchasing a particular book is likely to request book information on titles or for the same author over and over again. It is here assumed, for purposes of illustration, that the subscriber of the example message has repeatedly requested prices for books having AUTHOR values "Mark Day" and "John Steinbeck", as listed in Table 2 for a request formatted for the revised server. Therefore, as described in more detail with respect to step 432 below, the cache holds transformed AUTHOR elements for these values.

In general, a key component has a value that uniquely identifies each unique combination of the contents of a particular element. Therefore, according to an illustrated embodiment, a particular element that has been previously transformed is stored in the cache for the element in association with the value of its key component. In some cases, a key component consists of several sub-elements of the particular element. The AUTHOR element is a key component for the author name element. Therefore, in this example, the AUTHOR cache has transformed elements stored in association with various values of the author name elements. Table 3 shows the contents of an example cache for the AUTHOR element.

TABLE 3

Example Cache of Transformed AUTHOR elements

| key component value | transformed element |
|---|---|
| Steinbeck | \<AUTHOR\><br>   \<FIRSTNAME\> "John" \</FIRSTNAME\><br>   \<LASTNAME\> "Steinbeck" \</LASTNAME\><br>\</AUTHOR\> |
| Day | \<AUTHOR\><br>   \<FIRSTNAME\> "Mark" \</FIRSTNAME\><br>   \<LASTNAME\> "Day" \</LASTNAME\><br>\</AUTHOR\> |

In this example, in step 410, the message translator determines that the AUTHOR element having a value of "Steinbeck" has a transformed element stored in the cache.

If it is determined in step 410 that the next element of the current level has a transformed element stored in cache, then control passes to step 412 to place the transformed element from cache into the output message. For example the element in Table 6, in the second column of the first row below the row with column labels, is placed as the next element of the output message. Control then passes to step 440 to determine whether the last element in the top level of the hierarchy has been transformed.

If it is determined in step 410 that a transformed element has not already been stored in cache, then control passes to step 416 to begin transforming the element according to the rules stored in the static table associated with the element.

In step 416, tables are checked to determine actions to perform to transform the next element of the current level. For example, a static table for the AUTHOR element points to a rule for transforming a value of the author first name element and the last name element. The rule may be indicated and implemented in any manner known in the art. For example, a routine can be invoked to perform the transformation, or a message can be sent to another process that returns the desired values.

In step 420 the action indicated in the table is performed. In many embodiments, a value of a key component is passed as a parameter to a routine or process that executes the rule. When the next element of the current level is completely transformed, control passes to step 430. In some embodiments, the action takes data already placed in the output message and edits it, such as by inserting statements, deleting statement, and moving statements.

In many cases, the next element in the current level is made up of several sub-elements, which are elements in the next lower level of the hierarchy. For example, the AUTHOR element is made up of a FIRSTNAME element that is transformed using one rule, and a LASTNAME element that is transformed using a different rule. In such cases, before the next element is transformed, the sub-elements at the next lower level of the hierarchy are transformed. Thus in step 410 in such cases, the depth of the level of the hierarchy is incremented and control passes to step 402 at the next lower level of the hierarchy. Control passes to step 430 at the current level of the hierarchy only after control is returned from the lower level and the transformation of the next element at the current level is completed in step 420.

It is common, in step 420, for the process of incrementing the depth of the level to occur recursively, drilling down many levels into the hierarchy. In order that any rule being implemented at any level in the hierarchy is aware of its location in the hierarchy, information, such as the element name of the current level, is provided as context when control is passes to step 402 to operate on the next lower level in the hierarchy. For example, while transforming the element AUTHOR, the transform is aware of the context of the AUTHOR element with the FIRSTNAME element within the Body element within the SOAP envelope. In some embodiments, the context is provided as a series of element names concatenated into a context string. The number of levels of the hierarchy included in the context may be designed according to the application. For example, in some embodiments, the context information only includes levels of the hierarchy that are nested below the SOAP Body since the SOAP Header, if any, and SOAP Body can be transformed separately. In the illustrated example, the context string is "Body.FIRSTNAME" when the method 400 is applied to a AUTHOR element, but the context string contains only "Body" when the method 400 is applied to the FIRSTNAME element.

In some embodiments, step 420 also stores in a cache for the next element, associated with a value of the key component for that element, one or more parameters computed by the rule. In some embodiments, the cache is the same cache used to store transformed elements. In other embodiments, the cache may be a different cache, or in a different persistent or dynamic storage medium. In some embodiments, the action performed in step 420 includes incrementing or decrementing a counter; and the value of the counter is stored in the cache in association with the value of key component for the element. Such an embodiment is useful, for example, when there is a limit to how many sets of book information a particular subscriber may request in a given period of time.

In step 430, it is determined whether the action produces a transformed element. If not, processing of the current element is complete and control passes to step 440 to determine the next element or the next level of the hierarchy. For example, there may be a transform of an element that deletes the element without making a substitution. Therefore no transformed element is produced and control passes to step 440 from step 430.

If it is determined in step 430 that the action produces a transformed element, control passes to step 432 to handle the transformed element. In step 432 the transformed element is stored in the cache for the next element of the current level in association with the value of the key component.

In step 434, the transformed element is placed into the output message. Step 432 is context sensitive and includes steps to prevent the duplicating elements in the output message. In some embodiments, the rule executed in 420 that generates the transformed element also deletes from the output message the transformed sub-elements.

In step 440, it is determined whether the element just transformed is the last sub-element at the current level of a single element at the next higher level of the hierarchy. If not, control passes to step 402 to select another sub-element of that single element. If the element just transformed is the last element, control passes to step 450 to determine whether any more levels remain.

In step 452, it is determined whether the current level for which the last element has been transformed is the top level of the message. If not, control passes to step 454 to return to the calling action in step 420 performing the transform of the parent element of the sub-elements just transformed. For example, when the LASTNAME element has been transformed for the first book, control is returned to the rule that is transforming the AUTHOR element for the first book.

Similarly, when the AUTHOR element has been transformed for the last stock, control is returned to the rule that is transforming the Body element for all the books.

If it is determined, in step 452, that the current level just finished is the top level of the message, then the output message is sent. For example, when the Body element of the SOAP message is finished, the output message is sent to the existing server.

Matching the Service of the Second Server with the First Server

Using the methods of FIG. 3 and FIG. 4, one server can be used to match the services provided by another server. This section describes, in an example embodiment, how the first server 121a may match the services provided by the second server 121b using the message translator 142.

The client 102 sends the request illustrated in Table 2, which is formatted for a revised server, to the message translator 142 for the first time. The message translator makes the SOAP envelope the current level of the message hierarchy. The first element in the SOAP envelope, the Header element, is selected as the next element in step 402.

In step 406, it is determined that the Header element is to be transformed if it contains an entry needing transformation, such as a t:Threshold entry.

In step 410 the cache is checked; and it is determined that the Header element is not stored in the cache.

In step 416, a Header element table is checked to find an action to perform. It is assumed, for the illustrated example, that the action is to execute Routine A. Routine A transfers processing to the next deeper level in the hierarchy, conveying the context as "Envelope.Header," then invokes Routine B.

In step 420, the action is performed. The current level of the hierarchy and the context string are set to "Envelope.Header" and the control passes to step 402.

In step 402 the t:Threshold element is selected as the next element. In step 406 it is determined that the t:Threshold element is to be transformed and control passes to step 410. The t:Threshold is not in cache so control passes to step 416 to check tables mapping t:Threshold to actions. The action is determined to be not writing an element to the output message, i.e., the element is deleted. Control passes to step 430 where it is determined that no transformed element is produced, then to step 440 where it is determined that the t:Threshold element is the last element in the Header level. Control passes to step 450 where it is determined that the Header level is not the top level, and then to step 452 where control is returned to the calling action, Routine A for transforming the Header element, which is being executed in step 420. The current level is subtracted from the context string and returned to the level of the calling action. Thus the context and current level are "Envelope."

When control is returned to Routine A, Routine A invokes routine B. Routine B checks to see if any header entry elements remain in the header. If so, the items in the output message are enclosed between a Header open tag and a Header close tag. If not, the Header element is not written to the output message. In the illustrated example, no Header entries remain in the Header and no Header element is written to the output message. Thus the Header element is omitted from the output message. At this stage of processing, the output message includes no statements after the open tag for the Envelope element shown in lines 2 and 3 of Table 1.

In step 430 it is determined that no transformed element is produced and control passes to step 440. In step 440 it is determined that the Header element is not the last element in the Envelope level and control passes to step 402 to select the next element at the Envelope level.

In step 402 the Body element is selected as the next element. In step 406 it is determined that the Body element is to be transformed if the Header element contains a t:Threshold entry, and control passes to step 410. If a request already formatted for the second server is received, it would not have a t:Threshold entry and it would not be transformed. Instead control would pass to step 408 and the entire Body element would be placed into the output message.

In step 410, it is determined that no Body element is already in cache. A key component uniquely identifying a body is likely to be very long. In addition, it is not expected that an entire Body would be duplicated. Therefore, in some embodiments, no key component is assigned to the Body element and no cache is made for the entire Body element.

In step 416, a Body element table is checked to find an action to perform. It is assumed, for the illustrated example, that the action is to execute Routine C. Routine C enters a Body open tag, <SOAP-ENV:Body>, in the output message, then transfers processing to the next deeper level in the hierarchy, conveying the context as "Envelope.Body," and then enters a Body close tag, </SOAP-ENV:Body>, in the output message.

In step 420, the action is performed. The Body open tag is added to the output message as shown in line 4 of Table 1. The current level of the hierarchy and the context string are set to "Envelope.Body" and control passes to step 402.

In step 402 the USERID element is selected as the next element. In step 406 it is determined that the USERID element is not to be transformed and control passes to step 408. In step 408 the USERID element is added to the output message, as shown in line 5 of Table 1. Control passes to step 440, which passes control back to step 402.

The next time in step 402, the AUTHOR element for the first stock is selected as the next element. In step 406 it is determined that the AUTHOR element is to be transformed and control passes to step 410. The AUTHOR element is not in cache so control passes to step 416 to check tables mapping AUTHOR to actions.

In step 416, a AUTHOR element table is checked to find an action to perform. It is assumed, for the illustrated example, that the action is to transfers processing to the next deeper level in the hierarchy, conveying the context as "Envelope.Body.AUTHOR."

Control then passes to step 402 with the current level of the hierarchy as given by the context string. The elements at this level are the GIVEN element, and the FAMILY elements. Each is transformed in turn, as described in the preceding section, to yield the lines 10 through 11 of Table 1 from lines 12 through 13 of Table 2. The transformed elements are stored in association with a value of a key component made up of the GIVEN and FAMILY elements.

After the FAMILY element is transformed, control passes from step 440 to step 450 to step 452. In step 452, the context reverts to "Envelope.Body" and control passes back to step 420 for the first book's TITLE element. Control then passes to step 430 and 432, where the lines are added to the cache for the TITLE element. In step 434, nothing new is placed in the output message, because the sub-elements already placed there are the only lines in the transform.

The process described for the first book, is then repeated for the second book, to yield the lines 14 through 20 of Table 1 from lines 17 through 25 of Table 2. The process is repeated again until the last element in the Body element is reached in step 440. Control then passes to step 450 and to step 454.

After the translated request message is sent to the first server 121a, the first server returns to the message translator the response as depicted in FIG. 2B. The received message is then the response from the first server, as depicted in FIG. 2B, and the output message is a transformed response that is sent to the client 120, as depicted in FIG. 2D.

While translating the response, the only elements that are transformed are those identified in appropriate response transformation rules. The other elements are not transformed and are written directly to the output message. The rules may perform an inverse transform.

When the subscriber issues a subsequent request for book information, one or more book titles or authors are likely to be the same, but the time stamp associated with the request is likely to be different. Thus when the message translator performs step 410 for the elements on subsequent requests, transformed elements are found in cache, as shown in Table 6, and the transformed element is placed directly in the output message. Similarly, on translating the subsequent response message, the transformed elements are found in cache. Steps 416, 420, 430 and 432 are skipped for elements in these subsequent messages. The processing involved in step 420 can be significant, so skipping step 420 can provide significant savings of computational resources, and thus can provide significantly improved performance.

Hardware Overview

Figure 5:
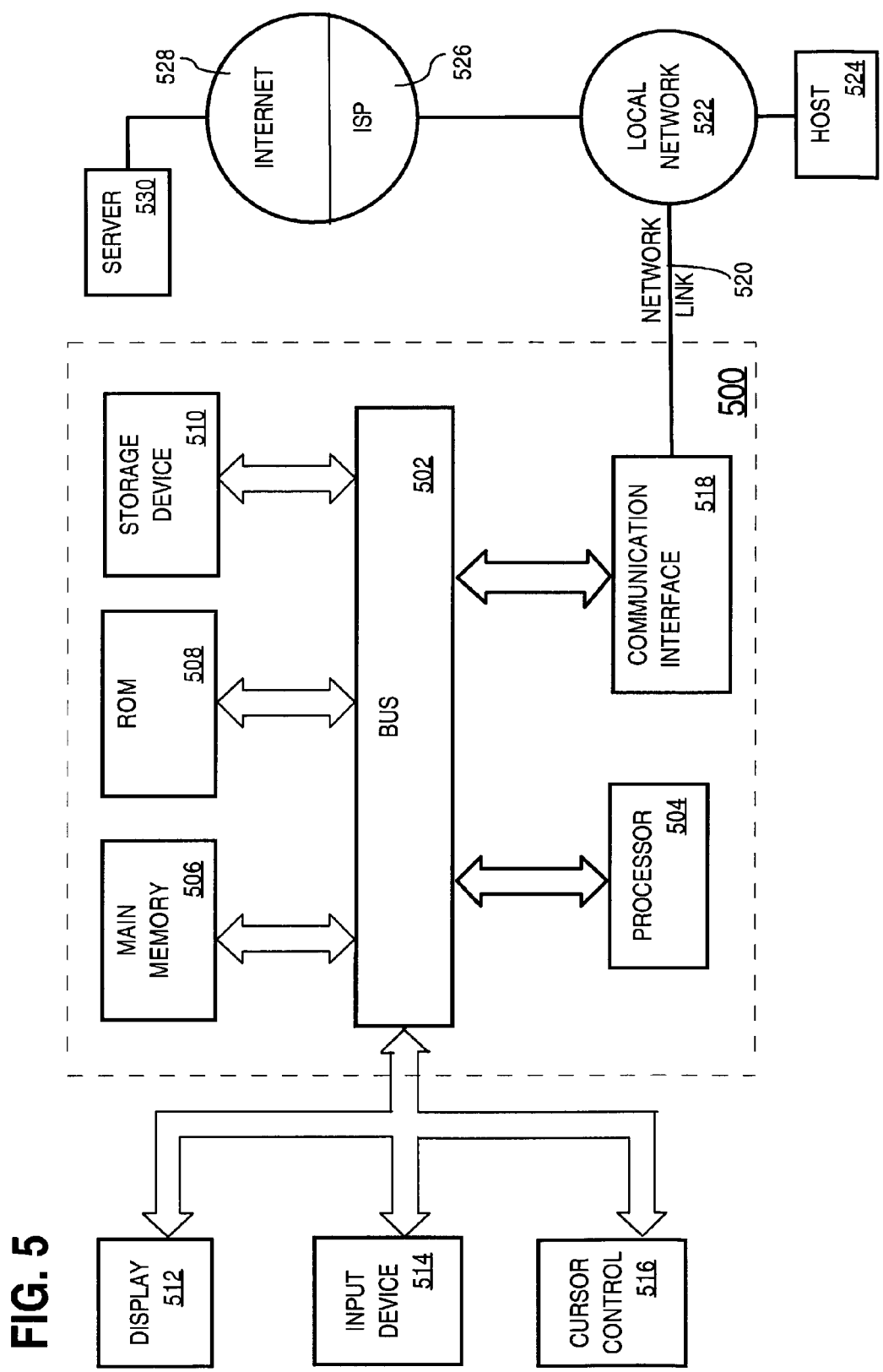
FIG. 5 is a block diagram that illustrates a computer system upon which an embodiment may be implemented.

FIG. 5 is a block diagram that illustrates a computer system 500 upon which an embodiment of the invention may be implemented. Some embodiments are implemented using one or more computer programs running on a network element such as a router device. Thus, in such an embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for matching services of a first server providing a service over a network with a second server providing a similar service, the method comprising the steps of:
    storing for a translator process transformation rules to transform between hierarchical elements of messages formatted for the first server and hierarchical elements of messages formatted for the second server;
    receiving, at the translator process, a first message formatted for a particular server of the first server and the second server;
    the translator process determining whether a first element in the first message is associated, in a cache of elements already transformed, with a second element for a second message formatted for a different server of the first server and the second server;
    if it is determined that the first element is not associated with the second element in the cache, then generating the second element by applying a first rule of the transformation rules to the first element; and
    generating the second message based, at least in part, on the second element.

2. A method as recited in claim 1, further comprising, if it is determined that the first element is associated with the second element in the cache, then performing the step of retrieving from the cache the second element.

3. A method as recited in claim 1, wherein:
    the first message indicates a destination for the message; and
    the method further comprises the steps of:
        generating the second message based, at least in part, on the second element; and
        sending the second message to the destination.

4. A method as recited in claim 3, wherein the destination is the different server.

5. A method as recited in claim 3, wherein the destination is a client that requested a service using a request formatted for the first server.

6. A method as recited in claim 1, further comprising, if it is determined that the first element is not associated with the second element in the cache, then, after said step of generating the second element, performing the step of storing the second element in the cache in association with the first element.

7. A method as recited in claim 1, wherein:
    the transformation rules transform a single hierarchical element of messages formatted for the particular server to one or more transformed elements of messages formatted for the different server; and
    the one or more transformed elements completely form a single hierarchical element of messages formatted for the different server.

8. A method as recited in claim 1, wherein the transformation rules transform a single hierarchical element of messages formatted for the particular server to no element of messages formatted for the different server.

9. A method as recited in claim 1, wherein:
    the method further comprises the step of determining whether the first element is to be transformed; and
    said step of determining whether the first element is associated with the second element in the cache is performed only if it is determined that the first element is to be transformed.

10. A method as recited in claim 1, said step of determining whether the first element is associated with a second element in the cache further comprising:
    determining a value for a key component of the first element, wherein the key component has a unique value for every unique instance of the first element; and
    determining whether a second element in the cache is associated with the value for the key component.

11. A method as recited in claim 6, said step of storing the second element in the cache in association with the first element further comprising:
    determining a value for a key component of the first element, wherein the key component has a unique value for every unique instance of the first element; and
    storing the second element in the cache in association with the value of the key component.

12. A method as recited in claim 1, said step of generating the second element using the first rule further comprising:
    determining a value of a key component of the first element, wherein the key component has a unique value for every unique instance of the first element;
    applying the first rule based on the value of the key component; and
    receiving the second element in response to applying the first rule.

13. A method as recited in claim 12, said step of generating the second element using the first rule further comprising:
    determining in the first rule a second rule based, at least in part, on the value of the key component;
    applying the second rule;
    receiving a component of the second element in response to applying the second rule; and
    forming the second element based, at least in part, on the component of the second element received from the second rule.

14. A method as recited in claim 12, wherein:
said step of determining the value of the key component further comprises searching a static table of transform actions for the first element, wherein the static table lists the key component and describes an action in association with the key component;
said step of applying the first rule further comprises performing the action described in the static table.

15. A method as recited in claim 14, said step of performing the action further comprising:
searching a second static table of transform actions for a sub-element of the first element, wherein the second static table lists a second key component of the sub-element and describes a second action in association with the second key component;
using the element as a context for the sub-element;
performing the second action described in the static table.

16. A computer-readable storage medium carrying one or more sequences of instructions for matching services of a first server providing a service over a network with a second server providing a similar service, wherein execution of the one or more sequences of instructions by one or more processors causes the one or more processors to perform the steps of;
storing transformation rules to transform between hierarchical elements of messages formatted for the first server and hierarchical elements of messages formatted for the second server;
receiving a first message formatted for a particular server of the first server and the second server;
the translator process determining whether a first element in the first message is associated, in a cache of elements already transformed, with a second element of a second message formatted for a different server of the first server and the second server;
if it is determined that the first element is not associated with the second element in the cache, then generating the second element of the second message formatted for the different server by applying a first rule of the transformation rules to the first element; and
generating the second message based, at least in part, on the second element.

17. An apparatus for matching services of a first server providing a service over a network with a second server providing a similar service, comprising:
a means for storing transformation rules to transform between hierarchical elements of messages formatted for the first server and hierarchical elements of messages formatted for the second server;
a means for receiving a first message formatted for a particular server of the first server and the second server;
a means for the translator process determining whether a first element in the first message is associated, in a cache of elements already transformed, with a second element of a second message formatted for a different server of the first server and the second server;
a means for generating the second element of the second message formatted for the different server by applying a first rule of the transformation rules to the first element if it is determined that the first element is not associated with the second element in the cache; and
generating the second message based, at least in part, on the second element.

18. An apparatus for matching services of a first server providing a service over a network with a second server providing a similar service, comprising:
a network interface that is coupled to the network for exchanging messages with a client;
one or more processors connected to the network interface;
one or more sequences of instructions which, when executed by a processor of the one or more processors cause the processor to provide the similar service of the second server; and
one or more stored sequences of instructions which, when executed by a processor of the one or more processors, cause the processor to carry out the steps of:
storing transformation rules to transform between hierarchical elements of messages formatted for the first server and hierarchical elements of messages formatted for the second server;
receiving a first message formatted for a particular server of the first server and the second server;
the translator process determining whether a first element in the first message is associated, in a cache of elements already transformed, with a second element of a second message formatted for a different server of the first server and the second server;
generating the second element of the second message formatted for the different server by applying a first rule of the transformation rules to the first element if it is determined that the first element is not associated with the second element in the cache; and
generating the second message based, at least in part, on the second element.

19. An apparatus as recited in claim 17, wherein:
the first message indicates a destination for the message; and
further comprising:
means for generating the second message based, at least in part, on the second element; and
means for sending the second message to the destination.

20. An apparatus as recited in claim 17, wherein:
the transformation rules transform a single hierarchical element of messages formatted for the particular server to one or more transformed elements of messages formatted for the different server; and
the one or more transformed elements completely form a single hierarchical element of messages formatted for the different server.

21. An apparatus as recited in claim 17, wherein:
further comprising means for determining whether the first element is to be transformed; and
said means for determining whether the first element is associated with the second element in the cache is performed only if it is determined that the first element is to be transformed.

22. An apparatus as recited in claim 17, said means for determining whether the first element is associated with a second element in the cache further comprising:
means for determining a value for a key component of the first element, wherein the key component has a unique value for every unique instance of the first element; and
means for determining whether a second element in the cache is associated with the value for the key component.

23. An apparatus as recited in claim 17, said means for generating the second element using the first rule further comprising:
means for determining a value of a key component of the first element, wherein the key component has a unique value for every unique instance of the first element;

means for applying the first rule based on the value of the key component; and means for receiving the second element in response to applying the first rule.

24. An apparatus as recited in claim 23, said means for generating the second element using the first rule further comprising:

means for determining in the first rule a second rule based, at least in part, on the value of the key component;

means for applying the second rule;

means for receiving a component of the second element in response to applying the second rule; and means for forming the second element based, at least in part, on the component of the second element received from the second rule.

25. An apparatus as recited in claim 23, wherein:

said means for determining the value of the key component further comprises searching a static table of transform actions for the first element, wherein the static table lists the key component and describes an action in association with the key component;

said means for applying the first rule further comprises performing the action described in the static table.

26. An apparatus as recited in claim 25, said means for performing the action further comprising:

means for searching a second static table of transform actions for a sub-element of the first element, wherein the second static table lists a second key component of the sub-element and describes a second action in association with the second key component;

means for using the element as a context for the sub-element; and means for performing the second action described in the static table.

27. An apparatus as recited in claim 18, wherein:

the first message indicates a destination for the message; and one or more stored sequences of instructions which, when executed by the one or more processors, further cause the one or more processors to carry out the steps of:
generating the second message based, at least in part, on the second element; and
sending the second message to the destination.

28. An apparatus as recited in claim 18, wherein:

the transformation rules transform a single hierarchical element of messages formatted for the particular server to one or more transformed elements of messages formatted for the different server; and the one or more transformed elements completely form a single hierarchical element of messages formatted for the different server.

29. An apparatus as recited in claim 18, wherein:

one or more stored sequences of instructions which, when executed by the one or more processors, further cause the one or more processors to carry out the step of determining whether the first element is to be transformed; and said step of determining whether the first element is associated with the second element in the cache is performed only if it is determined that the first element is to be transformed.

30. An apparatus as recited in claim 18, said step of determining whether the first element is associated with a second element in the cache further comprising:

determining a value for a key component of the first element, wherein the key component has a unique value for every unique instance of the first element; and determining whether a second element in the cache is associated with the value for the key component.

31. An apparatus as recited in claim 18, said step of generating the second element using the first rule further comprising:

determining a value of a key component of the first element, wherein the key component has a unique value for every unique instance of the first element;

applying the first rule based on the value of the key component; and receiving the second element in response to applying the first rule.

32. An apparatus as recited in claim 31, said step of generating the second element using the first rule further comprising:

determining in the first rule a second rule based, at least in part, on the value of the key component;

applying the second rule;

receiving a component of the second element in response to applying the second rule; and forming the second element based, at least in part, on the component of the second element received from the second rule.

33. An apparatus as recited in claim 31, wherein:

said step of determining the value of the key component further comprises searching a static table of transform actions for the first element, wherein the static table lists the key component and describes an action in association with the key component;

said step of applying the first rule further comprises performing the action described in the static table.

34. An apparatus as recited in claim 33, said step of performing the action further comprising:

searching a second static table of transform actions for a sub-element of the first element, wherein the second static table lists a second key component of the sub-element and describes a second action in association with the second key component;

using the element as a context for the sub-element; and performing the second action described in the static table.

* * * * *